United States Patent
Ijzerman et al.

(10) Patent No.: US 8,083,390 B2
(45) Date of Patent: Dec. 27, 2011

(54) LIGHTING DEVICE EMPLOYING A LIGHT GUIDE PLATE AND A PLURALITY OF LIGHT EMITTING DIODES

(75) Inventors: Willem Lubertus Ijzerman, Eindhoven (NL); Michel Cornelis Josephus Marie Vissenberg, Eindhoven (NL); Tim Dekker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 280 days.

(21) Appl. No.: 12/445,328

(22) PCT Filed: Oct. 12, 2007

(86) PCT No.: PCT/IB2007/054166
§ 371 (c)(1),
(2), (4) Date: Apr. 13, 2009

(87) PCT Pub. No.: WO2008/047285
PCT Pub. Date: Apr. 24, 2008

(65) Prior Publication Data
US 2011/0051456 A1    Mar. 3, 2011

(30) Foreign Application Priority Data

Oct. 16, 2006   (EP) .................................. 06122321
Jan. 11, 2007   (EP) .................................. 07100361

(51) Int. Cl.
*F21V 7/04*      (2006.01)
*G02F 1/1335*    (2006.01)

(52) U.S. Cl. ........ 362/606; 362/608; 362/610; 362/612; 349/62; 349/65

(58) Field of Classification Search .................. 362/612, 362/608, 555, 558, 97.3, 27, 29, 606, 610, 362/615, 621, 625, 628, 311.02, 311.06, 362/311.09, 311.1; 349/62, 65
See application file for complete search history.

(56) References Cited

U.S. PATENT DOCUMENTS

| 5,775,792 A | 7/1998 | Wiese |
| 7,011,420 B2 | 3/2006 | Cok |
| 7,182,499 B2 * | 2/2007 | Chen et al. .................... 362/621 |

(Continued)

FOREIGN PATENT DOCUMENTS
EP    1640756 A1    3/2006

OTHER PUBLICATIONS

Lumileds, "LED Backlight designs using Luxeon high flux light source solutions", 2004, Seattle, http://www.lumileds.com/pdfs/Luxeon_light_source_solutions.pdf.

*Primary Examiner* — Jong-Suk (James) Lee
*Assistant Examiner* — Tsion Tumebo
(74) *Attorney, Agent, or Firm* — Mark L. Beloborodov

(57) ABSTRACT

The present invention relates to a lighting device (10). The device comprises a light guide plate (12), and at least one array (14) of light emitting diodes (LEDs) (16), which LEDs are accommodated in holes (20) arranged in the light guide plate. The device is characterized by an array (24) of lenses (26) arranged such that light emitted by the LEDs passing the lens array is at least partly directed towards areas (28) of the light guide plate free from holes.

8 Claims, 4 Drawing Sheets

U.S. PATENT DOCUMENTS

| | | | |
|---|---|---|---|
| 7,452,118 B2* | 11/2008 | Tsuchiya | 362/608 |
| 7,463,315 B2* | 12/2008 | Chang | 349/61 |
| 7,557,781 B2* | 7/2009 | Chuang et al. | 345/82 |
| 7,808,706 B2* | 10/2010 | Fadel et al. | 359/619 |
| 2001/0019378 A1* | 9/2001 | Yamaguchi | 349/61 |
| 2002/0141006 A1 | 10/2002 | Pocius et al. | |
| 2003/0007344 A1* | 1/2003 | Parker | 362/31 |
| 2004/0022050 A1 | 2/2004 | Yamashita et al. | |
| 2005/0145867 A1 | 7/2005 | Yau et al. | |
| 2011/0037923 A1* | 2/2011 | Chuang et al. | 349/62 |

* cited by examiner

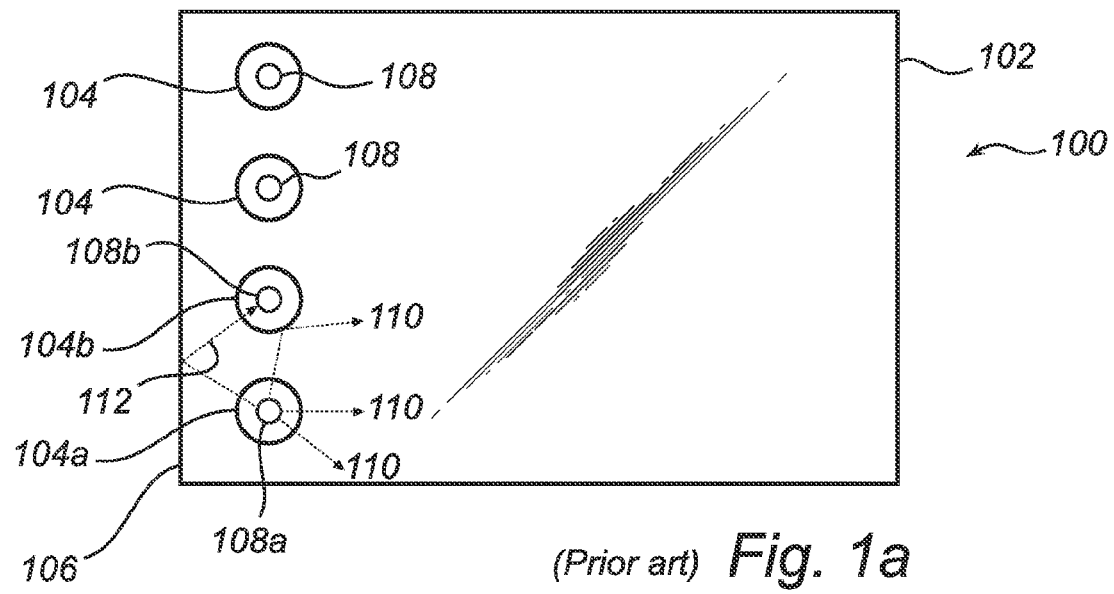
(Prior art) *Fig. 1a*
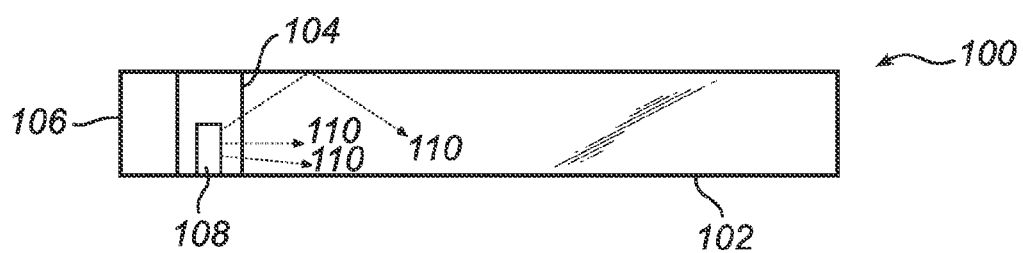
(Prior art) *Fig. 1b*

LIGHTING DEVICE EMPLOYING A LIGHT GUIDE PLATE AND A PLURALITY OF LIGHT EMITTING DIODES

This application is a national stage application under 35 U.S.C. §371 of International Application No. PCT/IB2007/054166 filed on Oct. 12, 2007, which claims priority to European Application No. 06122321.0, filed on Oct. 16, 2006, and European Application No. 07100361.0 filed on Nov. 1, 2006, both incorporated herein by reference.

FIELD OF THE INVENTION

The present invention relates to lighting device comprising a light guide plate and at least one array of light emitting diodes.

BACKGROUND OF THE INVENTION

Progress in the brightness, lumen efficacy and affordability of solid state light sources such as light emitting diodes (LEDs) enables new lighting applications that are no longer restricted to niche markets. LEDs offer several advantages over traditional light sources, such as long lifetime, low operating voltage, instant on, etc. For these and other reasons, LEDs are becoming more and more suited for making lamps for several applications such as color variable lamps, spotlights, LCD backlighting, architectural lighting, stage lighting, etc.

For many lighting applications, the light of a single LED is not sufficient, and light of multiple LEDs needs to be combined to form a light source. One solution is to mix light of multiple LEDs in a light guide, before the light leaves the lighting device. An example of such a solution is disclosed in the document "LED Backlight designs using Luxeon high flux light source solutions" by Lumileds, Seattle 2004, http://www.lumileds.com/pdfs/Luxeon_light_source_solutions.pdf. A backlight based on side-emitting LEDs described in this document is schematically illustrated in FIGS. 1a-1b. With reference to FIGS. 1a-1b, the backlight 100 comprises a light guide 102 provided with cylindrical through holes 104 which are arranged in a linear array along an edge 106 of the light guide. In each through hole, there is provided a side-emitting LED 108, whereby light from the LEDs is coupled into the light guide through the sidewall of the through holes, as illustrated by exemplary ray traces 110. The edge 106 is preferably reflective, to avoid unintended out-coupling of light via the edge.

However, in such a solution when a dense array of LEDs 108 is placed close to the edge 106 it may occur that light from one LED 108a is directed via reflection off the edge 106 (exemplary ray trace 112) towards another nearby hole 104b and gets absorbed or scattered at the LED 108b inside this hole. Thus, the lumen efficiency of such a lighting device is degraded.

SUMMARY OF THE INVENTION

It is an object of the present invention to overcome or at least alleviate this problem, and to provide a lighting device with improved lumen efficiency.

This and other objects that will be apparent from the following description are achieved by means of a lighting device, according to the appended claim 1, comprising a light guide plate and at least one array of light emitting diodes (LEDs), which LEDs are accommodated in holes arranged in the light guide plate, characterized by an array of lenses arranged such that light emitted by the LEDs passing the lens array is at least partly directed towards areas of the light guide plate free from holes.

Because of the lens array, no or little light strikes the nearby holes. Therefore, the LEDs can be placed closer together and losses due to absorption or scattering at nearby LEDs in the lighting device are diminished. Overall, the luminous efficiency and power of the lighting device can be increased.

Preferably, the lens array comprises at least one row of positive lenses, to readily direct the light in the wanted directions. Also preferably, the lens pitch is about ½ of the LED pitch, which provides to a feasible design of the lighting device.

In one embodiment, the lens array is placed between one LED array and a reflective edge of the light guide plate such that light emitted by the LEDs in the array and reflected by the reflector is directed by the lens array to pass between the LEDs in the array. Thereby, losses due to absorption or scattering at adjacent LEDs/holes in the array are diminished, and the luminous efficiency of the lighting device is increased. To further boost these effects, the LEDs are preferably aligned with every second junction between two adjacent lenses in the lens array.

In another embodiment, the lens array is placed between a first LED array and a second LED array such that light emitted by the LEDs in the first array and passing the lens array is directed by the lens array to pass between the LEDs in the second array. Thereby, losses due to absorption or scattering at LEDs/holes in the nearby array are diminished, and the luminous efficiency of the lighting device is increased. To further boost these effects, the distance between the first LED array and the lens array and the distance between the second LED array and the lens array are preferably equal. Further, the LEDs of the first array may be aligned with the optical axes of every second lens in a row of the lens array while the LEDs of the second array may be aligned with the optical axes of every other second lens in the row of the lens array. Alternatively, the LEDs may be aligned with every second junction between two adjacent lenses in a row of the lens array.

Preferably, the holes are cylindrical holes, and the LEDs are preferably side emitting LEDs, for useful in-coupling of light into the light guide plate.

BRIEF DESCRIPTION OF THE DRAWINGS

This and other aspects of the present invention will now be described in more detail, with reference to the appended drawings showing currently preferred embodiments of the invention.

FIG. 1a is a top view of a backlight according to prior art.

FIG. 1b is a cross-sectional side view of the backlight of FIG. 1a.

DETAILED DESCRIPTION

Figure 2:
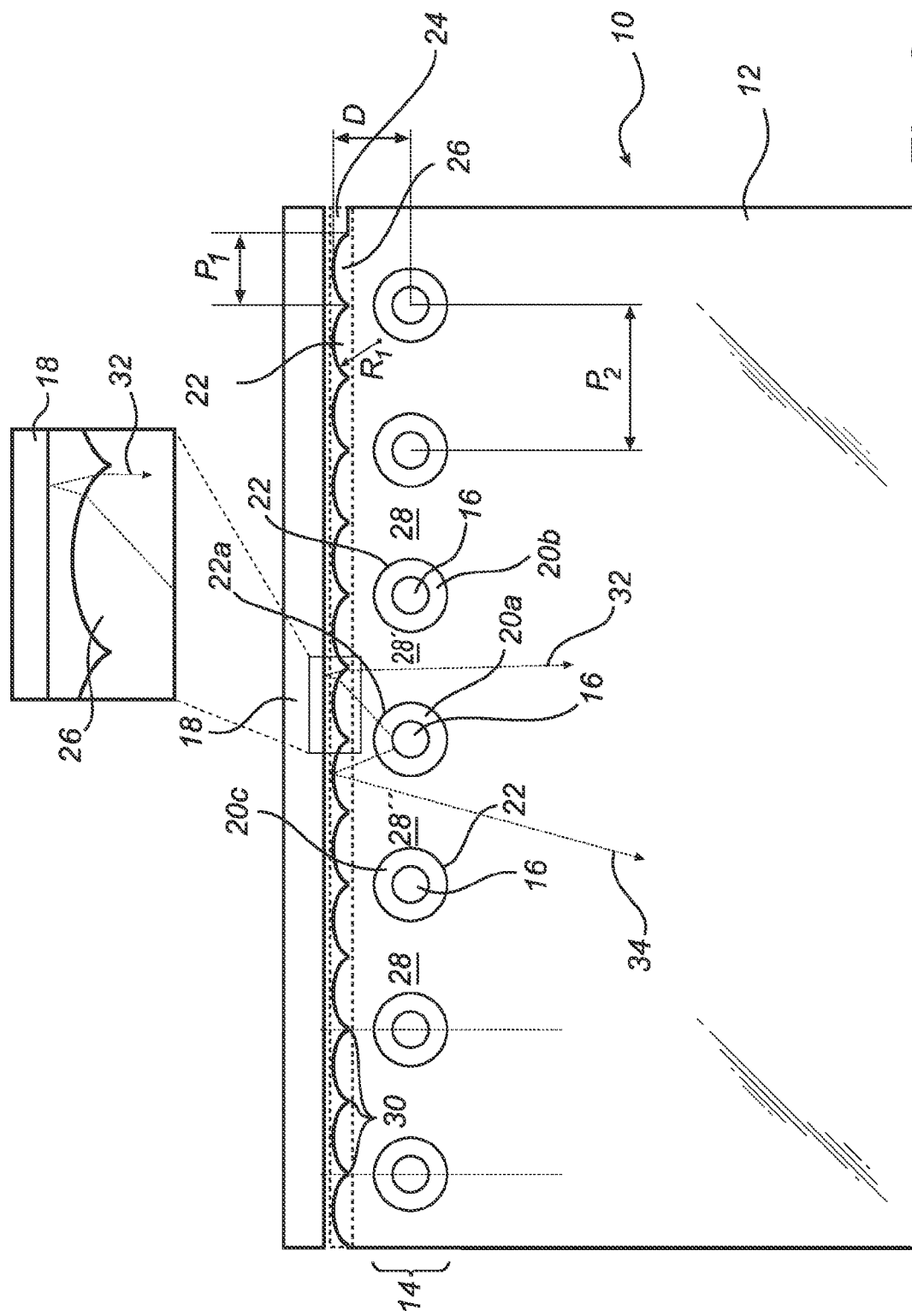
FIG. 2 is a partial top view of a lighting device according to a first embodiment of the invention.

A light emitting diode (LED) based lighting device according to a first embodiment of the present invention will now be described with reference to FIG. 2.

The lighting device denoted 10 comprises a light guide plate 12. The light guide plate 12 is transparent and can be made of glass or plastics (such as PMMA or PC), for example.

The lighting device 10 further comprises a linear array 14 of LEDs 16 arranged along a reflective edge 18 belonging to the light guide plate 12. The reflective edge 18 serves to direct any incident light back into the light guide plate 12, to avoid unintentional out-coupling of light from the light guide plate 12 via the edge. The LEDs 16 are preferably side-emitting omnidirectional LEDs.

The LEDs 16 are accommodated in cylindrical holes 20 having a circular lateral cross-section, which holes 20 are arranged in the light guide plate 12. 'Lateral' is in relation to the plane of the light guide plate. Each hole 20 has a circumferential side facet (cylinder wall) 22 through which light from the accommodated LED 16 is to be laterally coupled into the light guide plate 12. The holes 20 could be through holes or holes having an opening towards one side of the light guide plate 12 only.

According to the invention, the lighting device 10 further comprises a lens array 24. The lens array 24 is placed between the reflective edge 18 and the LED array 14, and it comprises one linear row of positive lenses 26. The lenses 26 may be formed separately or as integral parts of the light guide plate 12. Any gap between the lenses 26 and the reflective edge 18 can be filled with air, for example. The lens array 24 serves to direct light emitted from the LEDs 16 and reflected off the edge 18 towards areas of the light guide plate 12 free from or with no holes 20 (or LEDs 16, consequently). Namely, the light is directed to pass between the LEDs 16. To this end, in a preferred embodiment, the lens pitch $P_1$ is ½ of the LED pitch $P_2$($P_1$=½* $P_2$), and with every second junction 30 between two adjacent lenses 26 in the linear lens array 24 there is aligned an LED 16. The LED pitch $P_2$ is the distance between the centers of two adjacent LEDs 16, and "aligned with" means here that an imaginary line from the junction 30, which line is perpendicular to the main linear direction of the lens array, runs through the center of a LED 16. Further, the focal strength of a lens 26 should satisfy the following relation 1/f=1/D, where f is the focal length and D is the distance between the LED array 14 and the lens array 24 (the total lens strength $f_{tot}$ is formed by passing through lens 26 twice; $1/f_{tot}$=1/f+1/f=2/f and $1/f_{tot}$=1/D+1/D=2/D; hence 1/f=1/D). The focal length f is given by f=(n/(n−1))$R_1$, where n is the refractive index of the material of the light guide plate 12 and $R_1$ is the radius of each lens 26. The refractive index for PMMA is typically about 1.49 and the refractive index for PC is typically about 1.56. The various parameters mentioned above should be chosen such that lens radius $R_1$ is larger than ½ of the lens pitch $P_1$($R_1$>½* $P_1$), otherwise the lens array 24 cannot be realized. Also, to avoid too curved lens surfaces, which can be difficult to make, the parameters should preferably be chosen such that $R_1$>½* $P_1$ is by far not violated. In a feasible design, the radius of the cylindrical holes 18 is 3 mm and the LED pitch $P_2$ is 9 mm. The lens pitch $P_1$ is half the LED pitch $P_2$, that is $P_1$=4.5 mm. For example, when D=15, the lens radius $R_1$ becomes D*(n−1)/n=5 mm, which is larger than half the lens pitch $P_1$, whereby $R_1$>½* $P_1$ is satisfied.

Upon operation of the lighting device 10, a light ray 32 emitted by the LED 16a, which light ray 32 otherwise would have been reflected off the edge 18 an into the adjacent hole 20b (as in FIG. 1a), is focused by a corresponding lens 26 of the lens array 24 on its way towards the reflective edge 18. After reflection off the edge 18, the light ray 32 is again focused by the corresponding lens 26 towards the space 28' between the holes 20a and 20b and thus misses hole 20b. On the other hand, the direction of a light ray 34 emitted by the LED 16a, which light ray 34 otherwise would have been reflected off the edge 18 towards the space 28" between the holes 20a and 20c, is not altered significantly by the lens array 24 since the light ray 34 passes close to the optical axis of the lens 26 (whereas the light ray 32 passes the lens 26 off-axis and is refracted more strongly). Therefore, the light ray 34 is still directed towards the space 28" between the holes 20a and 20c and consequently misses the adjacent LEDs 16. Overall, the lens array 24 serves to image reflections of the LEDs 16 at spaces 28 between the real LEDs 16b, whereby losses due to absorption or scattering at adjacent LEDs are diminished, and the luminous efficiency of the lighting device 10 is increased.

Figure 3:
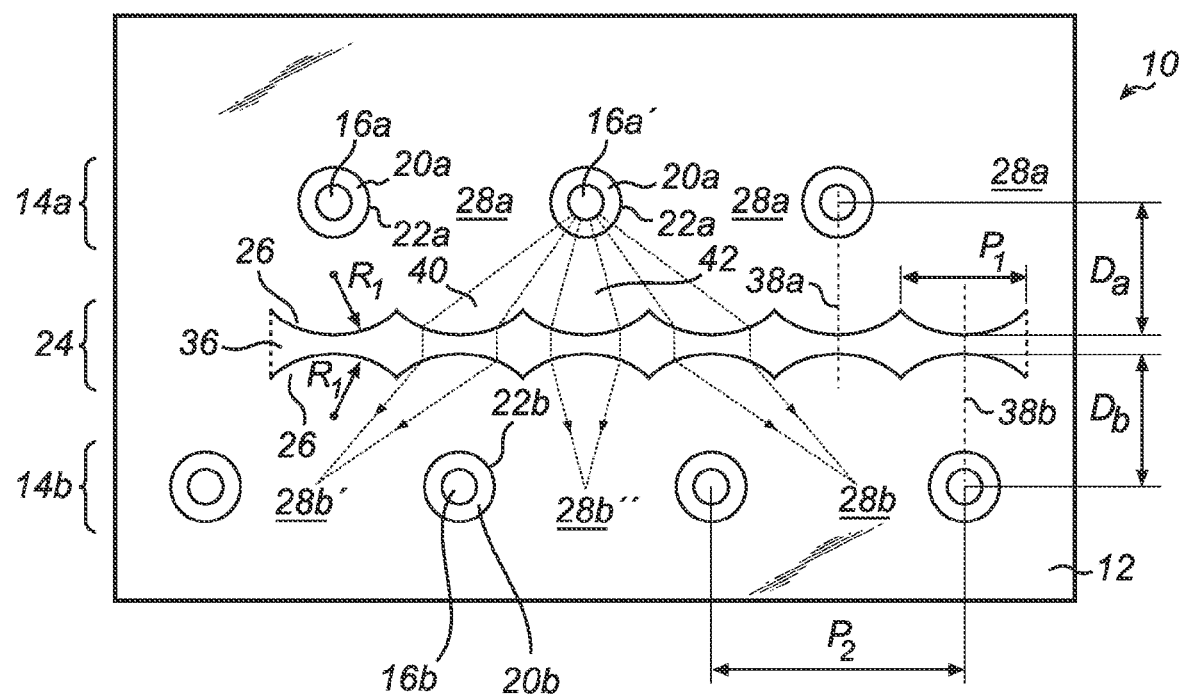
FIG. 3 is a partial top view of a lighting device according to a first variant of a second embodiment of the invention.
Figure 4:
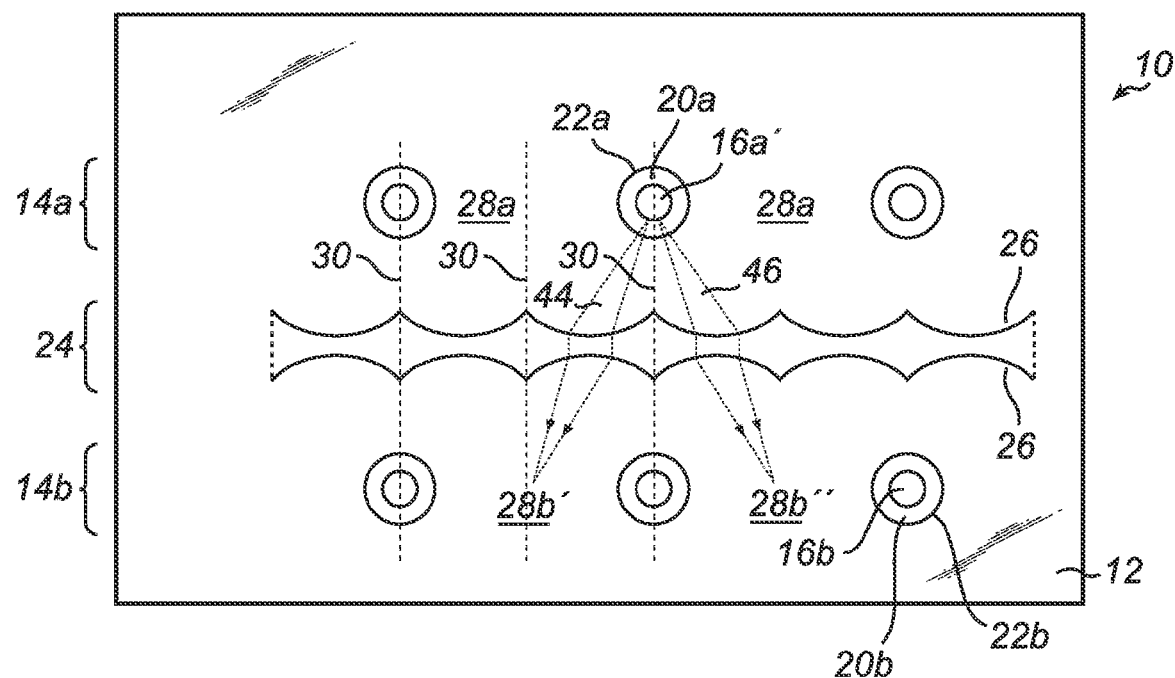
FIG. 4 is a partial top view of a lighting device according to a second variant of the second embodiment of the invention.

A lens array can also advantageously be used in a second embodiment, wherein two LED arrays are arranged parallel to each other, as illustrated in FIGS. 3-4. The function of the lens array is here to avoid that light from one array is absorbed or scattered at LEDs in the other array.

In a first variant (FIG. 3) of the second embodiment, the lighting device denoted 10 comprises a light guide plate 12. The light guide plate 12 should be transparent and can be made of glass or plastics (such as PMMA or PC), for example.

The lighting device 10 further comprises two parallel linear arrays 14 of LEDs 16. The LEDs 16 are preferably side-emitting omnidirectional LEDs.

The LEDs 16 are accommodated in cylindrical holes 20 having a circular lateral cross-section, which holes 20 are arranged in the light guide plate 12. Each hole 20 has a circumferential side facet (cylinder wall) 22 through which light from the accommodated LED 16 is to be coupled into the light guide plate 12. The holes 20 could be through holes or holes having an opening towards one side of the light guide plate 12 only.

According to the invention, the lighting device 10 further comprises a lens array 24 arranged in the light guide plate 12. The lens array 24 is placed between the two LED arrays 14 in an in-plane arrangement. The lens array 24 is formed by cutting or otherwise removing a portion 36 of the light guide plate 12, which portion 36 has the form of a linear array of biconcave or double concave lenses. Left is a linear lens array 24 with two rows of opposing positive lenses 26. The lens array 24 serves to direct light emitted from the LEDs 16 in one array and passing the lens array 24 towards areas of the light guide plate 12 free from or with no holes 20 (or LEDs 16, consequently). Namely, the light is directed to pass between the LEDs 16 of the other array. To this end, in a preferred embodiment, the lens pitch $P_1$ is ½ of the LED pitch $P_2$($P_1$=½*$P_2$), the distance $D_a$ between the LED array 14a and the lens array 24 and the distance $D_b$ between the LED array 14b and the lens array 24 are equal ($D_a$=$D_b$), and the LEDs 16a of array 14a are aligned with the optical axes 38a of every second lenses 26 of a row while the LEDs 16b of array 14b are aligned with the optical axes 38b of every other second lenses 26 of the row (thus, the two arrays 14a and 14b are displaced with half a LED pitch $P_2$ in relation to each other). Further, the focal strength of two opposing lenses 26 should satisfy the following relation 1/f=1/$D_a$+1/$D_b$, where f is the focal length. The focal length f is given by f=(½)(n/(n−1))$R_1$, where n is the refractive index of the material of the light guide plate 12 and $R_1$ is the radius of each lens 26. The refractive index for PMMA is typically about 1.49 and the refractive index for PC is typically about 1.56. The various parameters mentioned above should be chosen such that lens radius $R_1$ is larger than ½ of the lens pitch $P_1$($R_1$>½* $P_1$), otherwise the lens array 22 cannot be realized. Also, to avoid too curved lens surfaces, which can be difficult to make, the parameters should preferably be chosen such that $R_1$>½* $P_1$ is by far not violated. In a feasible design, the radius of the cylindrical holes 18 is 3 mm and the LED pitch $P_2$ is 9 mm. The lens pitch $P_1$ is half the LED pitch $P_2$, that is $P_1$=4.5 mm.

For a system with $D_a=D_b=15$, the lens radius $R_1$ becomes 5 mm, which is larger than half the lens pitch $P_1$, whereby $R_1 > \frac{1}{2} * P_1$ is satisfied.

Upon operation of the lighting device 10, a light beam 40 emitted by the LED 16$a'$, which light beam 40 otherwise at least partly would have struck at least one hole 20$b$ in the adjacent LED array 14$b$, is focused by two opposing lenses 26 in the lens array 24 such that the LED 16$a'$ is imaged at space 28$b'$ between two holes 20$b$ in array 14$b$. Consequently, the beam 40 misses the holes 20$b$ in the LED array 14$b$. Similarly, a light beam 42 is focused by lens array 24 imaging the LED 16$a'$ at space 28$b''$, and so on. Overall, the lens array 24 serves to image the LEDs 16$a$ of one array 14$a$ at spaces 28$b$ between the LEDs 16$b$ of the other array 14$b$, and vice versa, whereby losses due to absorption or scattering at LEDs in the nearby array are diminished, and the luminous efficiency of the lighting device 10 is increased.

In a second variant (FIG. 4) of the second embodiment, the LEDs 16 are aligned with every second junction 30 between two adjacent lenses 26 in a row of the lens array 22. Here a light beam 44 emitted by the LED 16$a'$ is focused by two opposing lenses 26 in the lens array 24 such that the LED 16$a'$ is imaged at space 28$b'$ between two holes 20$b$ in array 14$b$. Consequently, the beam 44 misses the holes 20$b$ in the LED array 14$b$. Similarly, a light beam 46 is focused by lens array 24 imaging the LED 16$a'$is at space 28$b''$, and so on.

The person skilled in the art realizes that the present invention by no means is limited to the preferred embodiments described above. On the contrary, many modifications and variations are possible within the scope of the appended claims. For example, in the first embodiment, instead of a straight reflective edge and linear LED array, the LEDs could be arranged in a curved array along a curved reflective edge, given that the radius of the curvature is considerably larger than the LED pitch. In the second embodiment, the lens array could comprise only one row of positive lenses. This requires that the lenses are more curved. In both the first and second embodiments, the LED pitch-lens pitch ratio could be different, for example 1:1. Also, the first and second embodiments could be combined in a single device comprising several parallel LED arrays, one of which is placed along a reflective edge of the light guide plate.

The invention claimed is:

1. A lighting device, comprising:
   a light guide plate defining a plurality of holes,
   at least one array of light emitting diodes (LEDs) at least partially disposed in the holes; and
   an array of lenses arranged such that light emitted by the LEDs passing said lens array is at least partly directed towards areas of the light guide plate free from holes, wherein the lens array is placed between a first LED array and a second LED array such that light emitted by the LEDs in the first array and passing the lens array is directed by the lens array to pass between the LEDs in the second array.

2. A device according to claim 1, wherein the array of lenses comprises at least one row of positive lenses.

3. A device according to claim 1, wherein the lens pitch (P1) is about ½ of the LED pitch (P2).

4. A device according to claim 1, wherein the distance (Da) between the first LED array and the lens array and the distance (Db) between the second LED array and the lens array are equal.

5. A device according to claim 1, wherein the LEDs of the first array are aligned with the optical axes of every second lens in a row of the lens array while the LEDs of the second array are aligned with the optical axes of every other second lens in the row of the lens array.

6. A device according to claim 1, wherein the LEDs are aligned with every second junction between two adjacent lenses in a row of the lens array.

7. A device according to claim 1, wherein the holes are cylindrical holes.

8. A device according to claim 1, wherein the LEDs are side emitting LEDs.

* * * * *